(12) United States Patent
Chester

(10) Patent No.: US 9,278,744 B1
(45) Date of Patent: Mar. 8, 2016

(54) CHETPROP AIR OR WATER PROPELLER AND SPINNER WITH FRONT AND BACK LEG ASSEMBLIES ATTACHED TO SPINNER

(71) Applicant: Frank Chester, San Francisco, CA (US)

(72) Inventor: Frank Chester, San Francisco, CA (US)

(*) Notice: Subject to any disclaimer, the term of this patent is extended or adjusted under 35 U.S.C. 154(b) by 0 days.

(21) Appl. No.: 14/669,341

(22) Filed: Mar. 26, 2015

(51) Int. Cl.
*B64C 11/00* (2006.01)
*B63H 1/26* (2006.01)
*B63H 5/125* (2006.01)

(52) U.S. Cl.
CPC ............... *B63H 1/26* (2013.01); *B63H 5/125* (2013.01); *B64C 11/00* (2013.01)

(58) Field of Classification Search
CPC ............ B63H 1/26; B63H 5/125; B63H 1/14; B63H 1/265; B63H 1/28; B63H 1/12; B01F 15/00019; B01F 15/00006; F03D 1/0608; F04D 25/088; F04D 29/34; F04D 29/36; F04D 29/362; F04D 25/10; F05B 2220/7066; F05B 2240/30; F05B 2240/301; F05B 2250/11; F05B 2250/314; B64C 11/00; B64C 11/04; B64C 11/14; B64C 11/16; B64C 11/20
See application file for complete search history.

(56) References Cited

U.S. PATENT DOCUMENTS

| | | | | |
|---|---|---|---|---|
| 871,729 | A * | 11/1907 | McChord | B64C 11/065 416/207 |
| 1,532,346 | A * | 4/1925 | Roberts | B63H 1/12 416/210 R |
| RE16,370 | E * | 6/1926 | Roberts | B63H 1/12 416/210 R |
| 1,733,251 | A * | 10/1929 | Deering | B63H 1/12 416/202 |
| 3,143,815 | A * | 8/1964 | Kane | E01H 5/096 37/196 |
| 3,333,827 | A * | 8/1967 | Lucke | B01F 7/00158 366/173.1 |
| 3,362,690 | A * | 1/1968 | McSwain | B01F 7/00208 261/93 |
| 3,420,311 | A | 1/1969 | Davies et al. | |
| 3,575,530 | A | 4/1971 | Hall | |
| 3,826,591 | A * | 7/1974 | Wilson | B63H 1/16 416/177 |
| 3,968,944 | A | 7/1976 | Zimmer et al. | |
| 4,533,101 | A | 8/1985 | Patterson, Jr. | |
| 4,560,321 | A * | 12/1985 | Kawai | F04D 29/362 416/163 |
| 4,642,028 | A | 2/1987 | Buckman et al. | |
| 4,652,213 | A | 3/1987 | Thibert et al. | |
| 4,730,981 | A * | 3/1988 | Kawai | F04D 25/10 416/170 R |
| 5,176,501 | A * | 1/1993 | Yellowley | B63H 1/26 416/224 |
| 5,261,788 | A * | 11/1993 | Kilburn | F01D 5/141 416/5 |
| 5,326,168 | A * | 7/1994 | Miura | B01F 7/003 366/343 |
| 6,364,614 | B1 * | 4/2002 | Mnatsakanian | A47G 33/0809 416/223 R |
| 6,893,223 | B2 * | 5/2005 | Roberts | F03D 1/0608 416/210 R |

(Continued)

*Primary Examiner* — Nathaniel Wiehe
*Assistant Examiner* — Eldon Brockman
(74) *Attorney, Agent, or Firm* — Steven A. Nielsen; www.NielsenPatents.com

(57) ABSTRACT

An air or watercraft propeller comprises a plurality of blade systems wherein each blade system is composed of a front leg attached to a back blade. The front legs pull air or water towards spinner while the back legs use vertical suction to draw air or water towards the spinner to complement the air or water flow created by the front legs. The back legs are angularly attached to the spinner at approximately 60 degrees rotated from the spinner center line. The back legs are also tilted to an angle of approximately 60 degrees from the surface of the spinner. The front legs are attached to the back legs at an angle of approximately 60 degrees. The propeller system presents several equilateral triangles to maximize propulsion efficiency. The front legs are rigidly attached to the spinner while the back legs may be adjusted for pitch.

2 Claims, 9 Drawing Sheets

(56) References Cited

U.S. PATENT DOCUMENTS

| | | | |
|---|---|---|---|
| 6,976,653 B2 | 12/2005 | Perlo et al. | |
| 7,401,974 B2 * | 7/2008 | Himmelsbach | B01F 7/00341 366/330.3 |
| 7,716,869 B2 * | 5/2010 | Ciotlos | A01K 85/00 43/42 |
| 8,177,512 B2 * | 5/2012 | Mosiewicz | F04D 29/34 416/204 R |
| 8,221,080 B2 | 7/2012 | Clemen | |
| 8,421,260 B2 * | 4/2013 | Duke | F03B 13/10 290/54 |
| 8,851,828 B2 * | 10/2014 | Zhang | F03D 1/0608 415/4.1 |
| 2004/0126241 A1 | 7/2004 | Zha et al. | |
| 2007/0268779 A1 * | 11/2007 | Himmelsbach | B01F 7/00341 366/330.3 |
| 2011/0176920 A1 * | 7/2011 | Zhang | F03D 1/0608 416/188 |
| 2011/0299991 A1 * | 12/2011 | Shpadi | B63G 1/265 416/223 R |

* cited by examiner

CHETPROP AIR OR WATER PROPELLER AND SPINNER WITH FRONT AND BACK LEG ASSEMBLIES ATTACHED TO SPINNER

BACKGROUND OF THE INVENTION (1) Field of the Invention

The invention generally relates to propellers. More particularly, the invention relates to propellers with components in front of a spinner.

(2) Description of the Related Art

In the related art, propellers typically comprise a plurality of single blades attached to a hub, with the hub found beneath a spinner. A prior art hub cone or hub spinner is found in U.S. Pat. No. 8,221,080 issued on Jul. 17, 2012 to Clemen. A prior art mono blade system is found in U.S. Pat. No. 4,652,213 issued on Mar. 24, 1987 to Thibert et al. The related art teaches the use of mono blades having just one leading edge and just one trailing edge. The related art teaches pull systems wherein mono blades pull air or water over the spinner. The related art fails to teach means of both pulling and vortical suction of air or water. The related art fails to teach, disclose or suggest the use of compound blade systems attached to a spinner. Thus, for this and other reasons, there is ample room in the art for the disclosed embodiments.

BRIEF SUMMARY OF THE INVENTION

The present invention overcomes shortfalls in the related art by presenting an unobvious and unique combination, configuration and use of a compound blade system comprising a front leg angularly attached to a spinner with the front leg angularly attached to a back leg. Each back leg may be considered a propeller even though mounted in a new fashion. Disclosed embodiments overcome shortfalls in the related art by using a plurality of back legs or propeller components to pull the air or watercraft forward or to otherwise create a vortical suction of air or water to synergistically interact with the front legs, wherein the front legs are simultaneously pulling the air or watercraft forward. The disclosed dual part or compound prolusion system achieves new found efficiencies and is natively adaptable for retrofit applications to existing air or watercraft.

In a retrofit application, a disclosed spinner replaces an existing spinner. The functions of propeller pitch adjustment occur within a connection or junction of attachment connecting the front leg to the back leg. While the front leg may be rigidly attached to the spinner, pitch adjustment components may run longitudinally within the front leg and reach the back leg. The disclosed configuration vitiates the need for voids within the spinner to accommodate protruding blades or inner shanks as taught by U.S. Pat. No. 4,642,028 at FIG. 1 and FIG. 2. Such spinner voids or openings introduce drag as the spinner is not composed in a solid aerodynamic configuration. The disclosed embodiments overcome this shortfall in the art as the front legs are integral to the spinner with no exposed voids.

Disclosed embodiments overcome short falls in the related art by use and disclosure of a new blade system wherein each blade assembly comprises a front leg having both a leading edge and a trailing edge and an attached back leg, having separate but yet complimentary leading and trailing edges. Each back leg has a separate suction surface and pressure surface that is different, separate but yet complimentary to the suction and pressure surfaces of the attached front leg.

Disclosed embodiments overcome shortfalls in the art by the placement and positioning of the front legs upon the spinner and by the placement and positioning of the back legs to the front legs. A plurality of front legs may be rigidity attached or integral to the spinner at an angle of between 40 to 80 degrees from the surface of the spinner, with 60 degrees being the best mode known to date. Leading or trailing edges of the front legs may be between 40 to 80 degrees from a center line running from the tip of the spinner to the base of the spinner, with 60 degrees being the best mode known to date.

The back legs may be attached to the front legs at an angle of between 40 to 80 degrees, with 60 degrees being the best mode known to date.

Disclosed embodiments present a new open propulsion system being open around the center of the spinner and presenting components in front of the spinner. Having components in front of the spinner overcomes shortfalls in the art as the disclosed pull-vortical suction system is made possible.

Shortfalls in the related art are overcome by use of stable and efficient equilateral triangle systems wherein a top view of the back legs presents an equilateral triangle, maximizing propulsion efficiency. Shortfalls in the related art are overcome by the positioning of the front legs as equilateral triangles are created and seen in various elevation and perspective views of the disclosed embodiments. Here again, an equilateral triangle design maximizes propulsion efficiency. Such equilateral triangles are not possible with the mono blade constructions of the related art. In summary, the equilateral triangle systems maximize propeller or blade area and efficiencies of propulsion.

Other advantages over the related art include the three dimensional and expanded areas of propulsion offered by the angular attachments of the front legs to the spinner and angular attachments of the back legs to the front legs. In the related art, propellers or propeller systems have a near two dimensional quality only of mostly length and width and are all directly attached to the spinner or underlying hub. Such configurations provide minimal air or water displacement as comparted to the present invention. In the related art, each mono propeller radiates directly away from the center of the spinner. In contrast, the presently disclosed embodiments present skewed or angled propeller components that are angled in both vertical and horizontal orientation from the spinner. Disclosed embodiments present a significant dimension of depth not found in the related art.

The presently disclosed embodiments may be considered a reversed version of related art systems.

Figure 1:
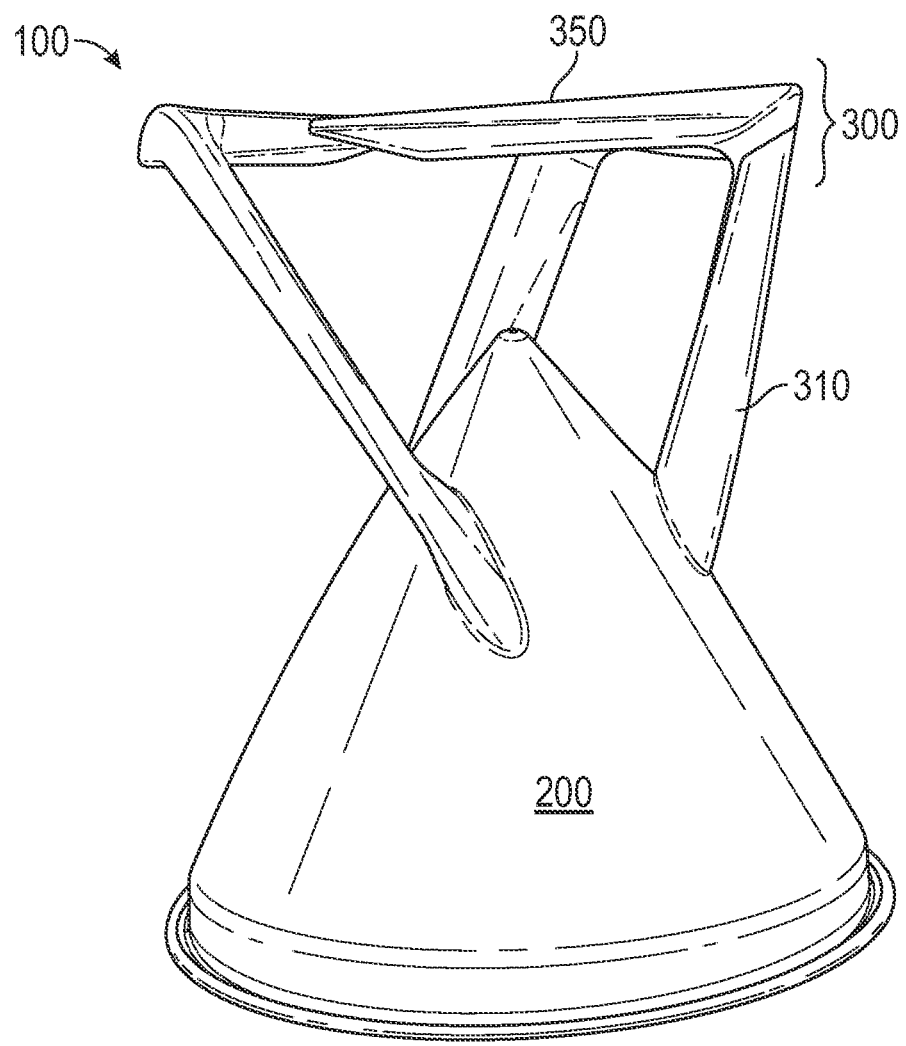
FIG. 1 is an elevation view showing one embodiment of the invention.

REFERENCE NUMERALS IN THE DRAWINGS 100 disclosed embodiment in general
200 spinner
205 inner surface of spinner
210 front tip of spinner
230 base section of spinner
300 disclosed blade system
310 front leg or front propeller blade
312 base section of front leg or front leg base section
314 distal section of front leg or front leg distal section
316 leading edge of front leg
318 trailing edge of front leg
320 upper surface of front leg
322 lower surface of front leg
330 connection or junction of attachment of front leg 310 and back leg 350
350 back leg or back propeller blade
352 medial section of back leg, or back leg medial section
354 lateral section of back leg or back leg lateral section
366 leading edge of back leg
368 trailing edge of back leg
370 upper surface of back leg suction surface or pressure surface
372 lower surface of back leg
400 longitudinal spinner reference line of spinner between base 230 of spinner and tip 210 of spinner
430 longitudinal front leg reference line upon front leg 310 between distal section 314 and base section 312
435 longitudinal lower surface front leg reference line upon a lower surface of front leg
450 longitudinal back leg reference line upon back leg 350 between medial section 352 and lateral section 354
500 angle between longitudinal line of spinner and longitudinal line of front leg
505 angle between 430 and 450
510 vertical orientation or angle between front leg and surface of spinner
600 optional spin assembly These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a disclosed embodiment 100 is shown having a plurality of disclosed blade systems 300 with each blade system comprising a front leg 310 or front propeller blade attached to a spinner 200 and with the front leg attached to a back leg 350.

Figure 2:
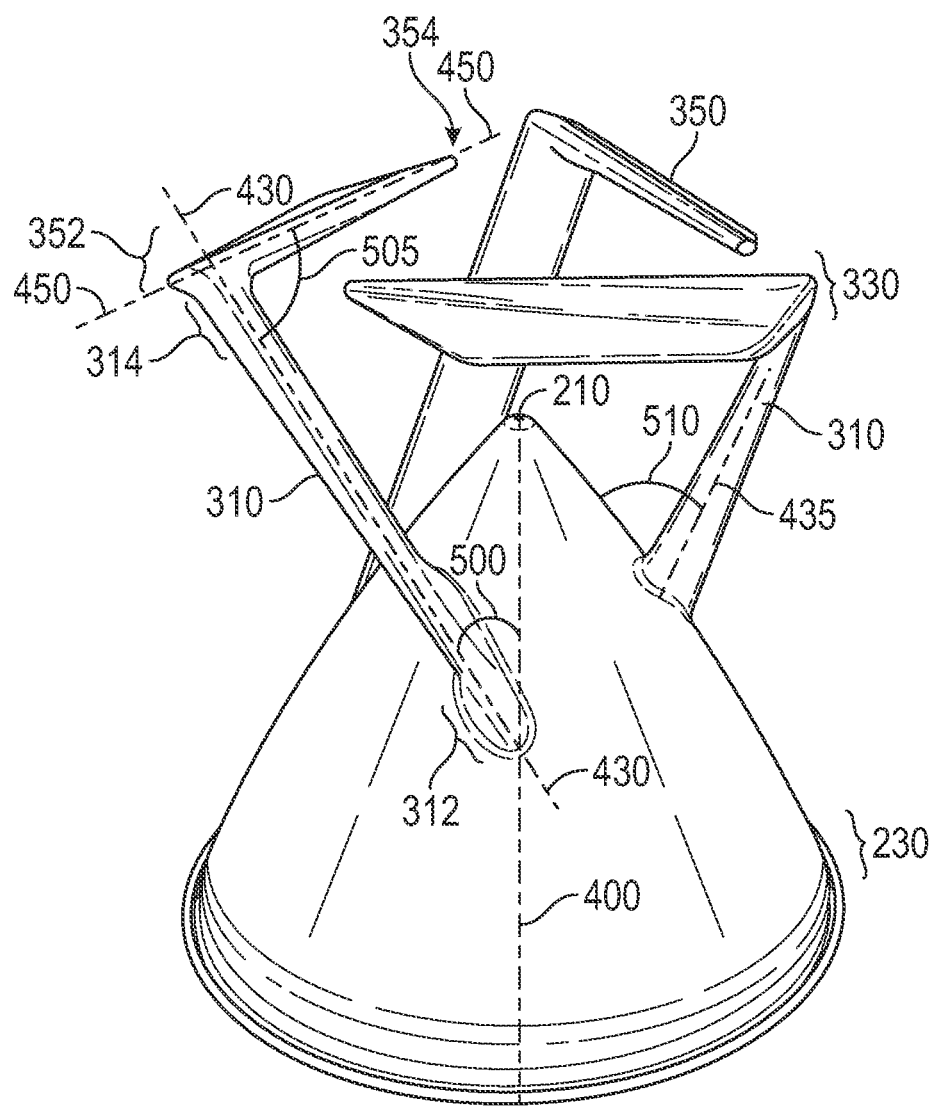
FIG. 2 is a perspective view of a disclosed embodiment
Figure 3:
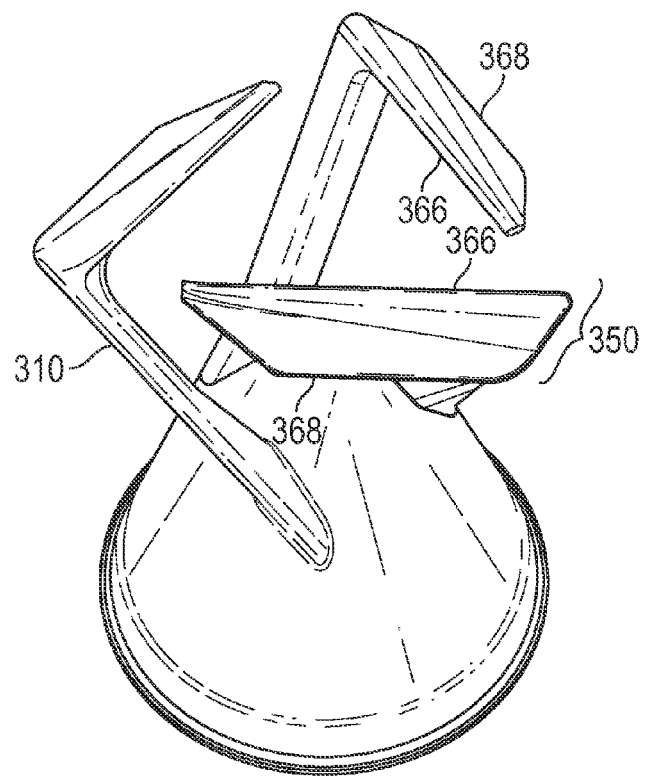
FIG. 3 is perspective view of a disclosed embodiment

Referring to FIG. 2, a spinner 200 comprises a front tip 210 and a base section 230. A longitudinal spinner reference line 400 is drawn from the front tip 210 to the base section 230 of the spinner. A longitudinal front leg reference line 430 is drawn along a trailing edge of a front leg and is at an angle 500 of between 40 to 80 degrees from the longitudinal spinner reference line.

A front leg 310 may comprise a front leg base section 312 in angular attachment to a spinner 200. A front leg may further comprise distal section 314 on the opposite end of the front leg base section 312.

A back leg 350 may comprise a back leg medial section 352 in angular attachment to the distal section 314 of the front leg. A back leg may further comprise a lateral section 354 or back leg lateral section. A longitudinal back leg reference line 450 is drawn upon a top surface of a back leg and is at an angle 505 of between 40 to 80 degrees from the longitudinal front leg reference line 430 of the front leg.

Another angle attachment of a front leg is shown upon the right side of FIG. 2 wherein a lower surface 322 of a front leg is shown with a longitudinal lower surface front leg reference line 435 having an angle 510 of between 30 to 80 degrees from the surface of the spinner. Thus, the angles of attachment of the first leg to the spinner comprise an angle 500 between the first leg and spinner center line 400 and an angle 510 between the first leg and the outer surface of the spinner. These two angles are optimally 60 degrees but may be in the range of 40 to 80 degrees. These two angles as well as the angle 505 between the front and back legs, provide the equilateral triangle qualities discussed herein.

Figure 4:
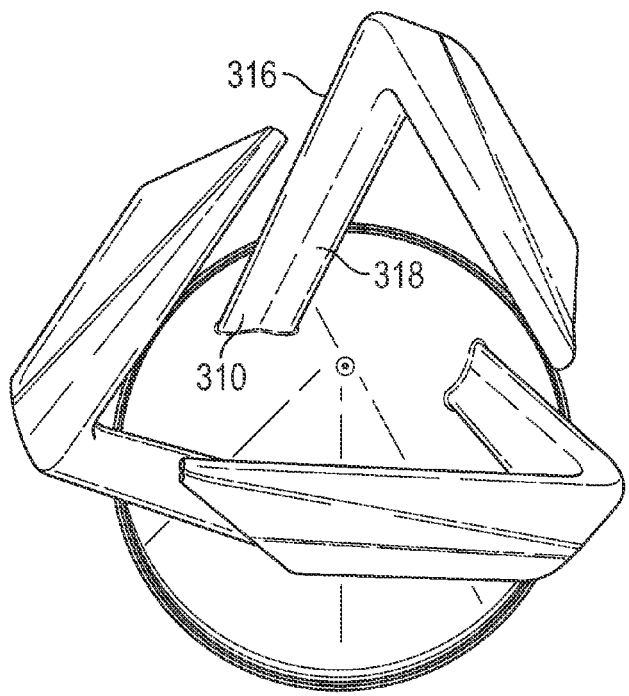
FIG. 4 is a top plan view of a disclosed embodiment

Referring to FIG. 4, a back leg 350 is shown to comprise a leading edge 366 and a trailing edge 369. The leading edge 366 is facing toward the center of the spinner while the trailing edge faces towards the periphery of the spinner. This configuration assists in providing suction from the rotation of the back legs.

Figure 5:
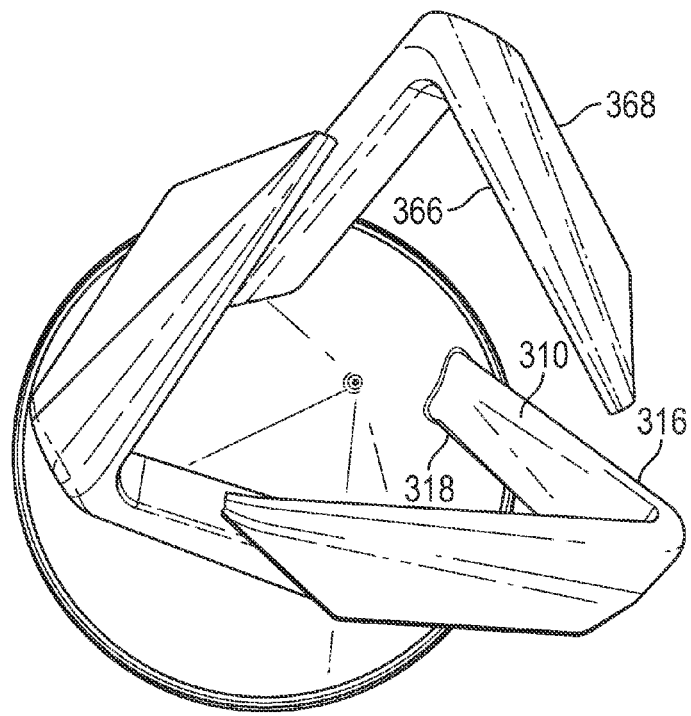
FIG. 5 is a front and side perspective view of a disclosed embodiment

FIG. 5 depicts a front leg 310 comprising a leading edge 316 and a trailing edge 318. A front leg 310 includes a leading edge 316 and a trailing edge 318.

Figure 6:
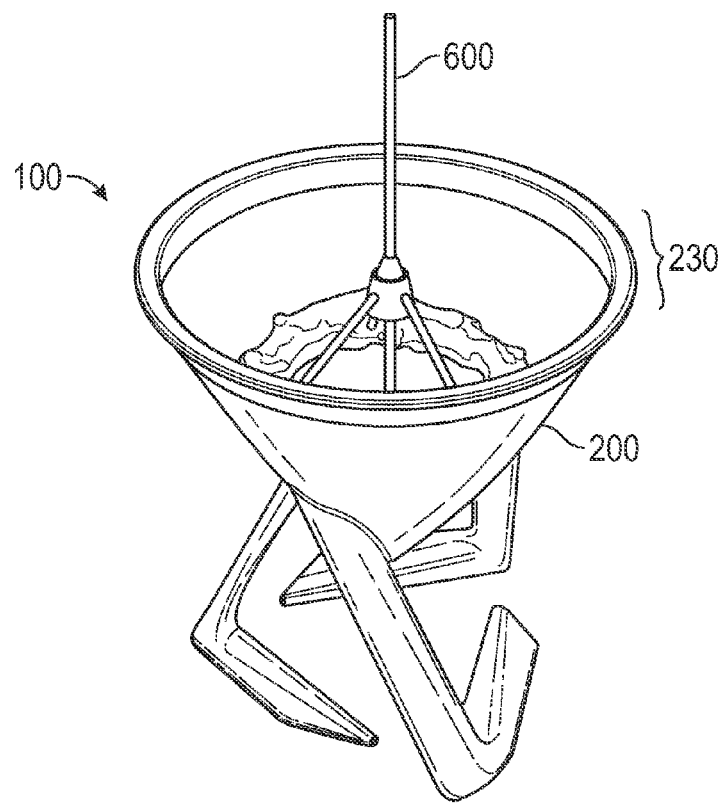
FIG. 6 is a bottom and side perspective view of a disclosed embodiment

FIG. 6 depicts a disclosed embodiment 100 with the base section 230 of the spinner exposed. An optional spin assembly 600 is shown. Disclosed embodiments contemplate traditional hubs and other mechanical apparatuses to spin the spinner and to implement pitch adjustments in the back legs.

Figure 7:
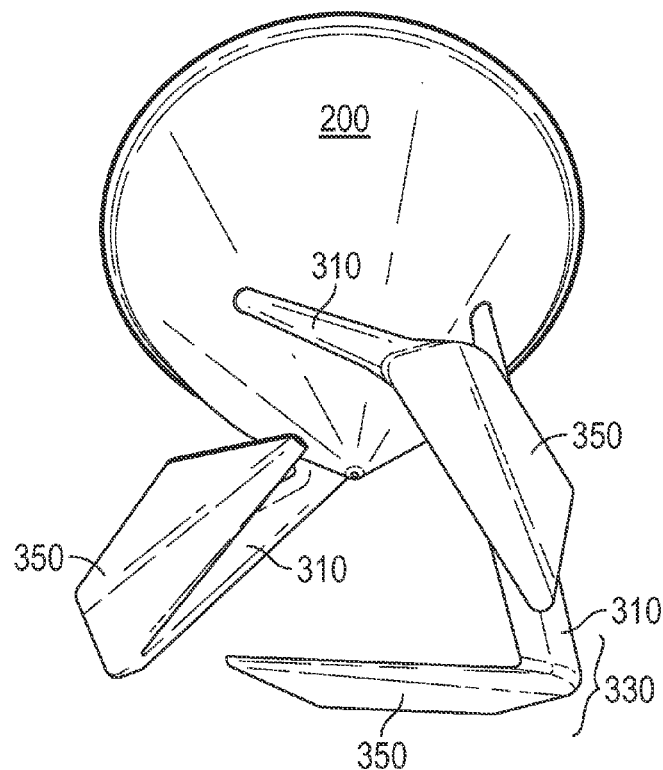
FIG. 7 is a top and side perspective view of a disclosed embodiment

FIG. 7 depicts a disclosed embodiment comprising a spinner 200, front leg 310 and back leg 350. A back leg and front leg may be connected at a connection or junction 330.

Figure 8:
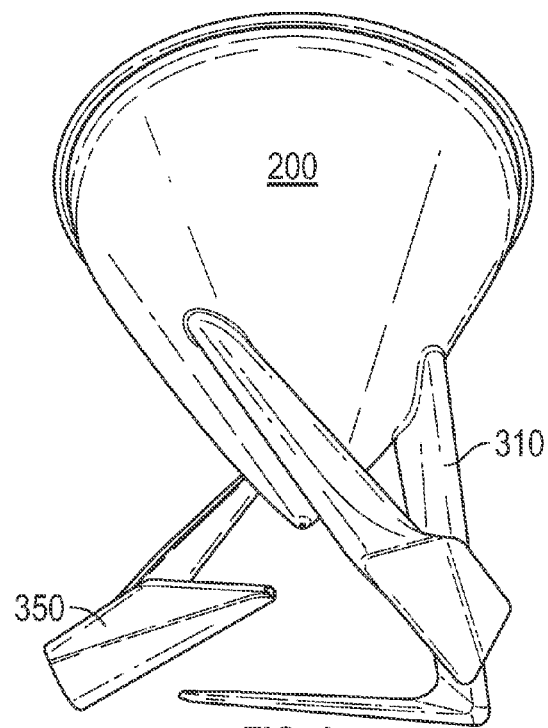
FIG. 8 is a side perspective view of a disclosed embodiment

FIG. 8 depicts a disclosed embodiment.

Figure 9:
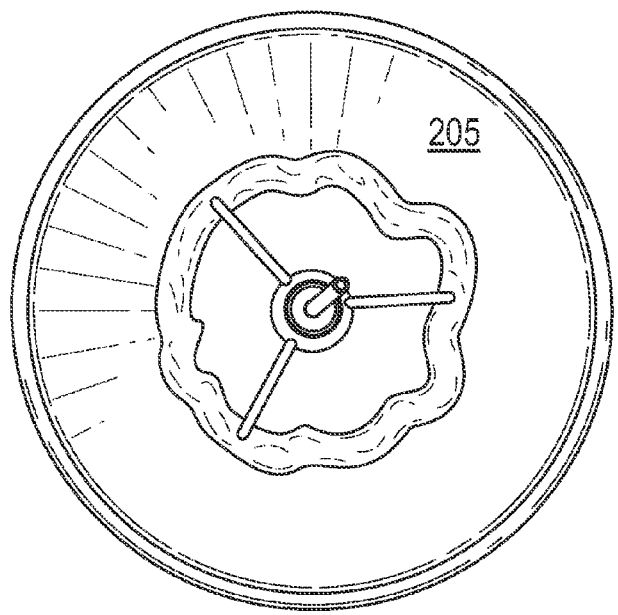
FIG. 9 is a bottom plan view of a disclosed embodiment

FIG. 9 depicts a bottom plan view and exposes an inner surface 205 of a spinner. The inner surface may accommodate various components for rotation. An optional spin assembly 600 is shown.

Figure 10:
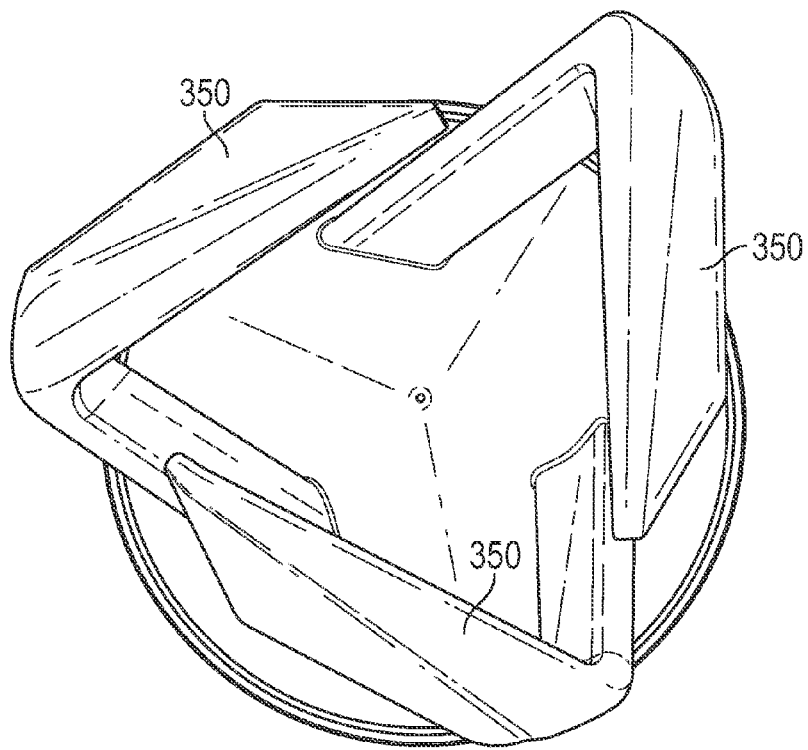
FIG. 10 is a top plan view of a disclosed embodiment

FIG. 10 depicts a top plan view of a disclosed embodiment showing the equilateral triangle properties of three back legs 350.

Figure 11:
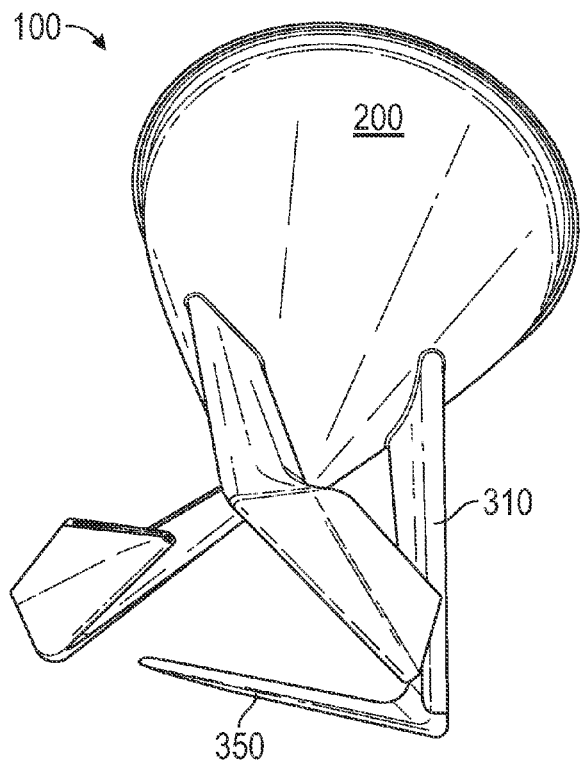
FIG. 11 is a side perspective view of a disclosed embodiment
Figure 12:
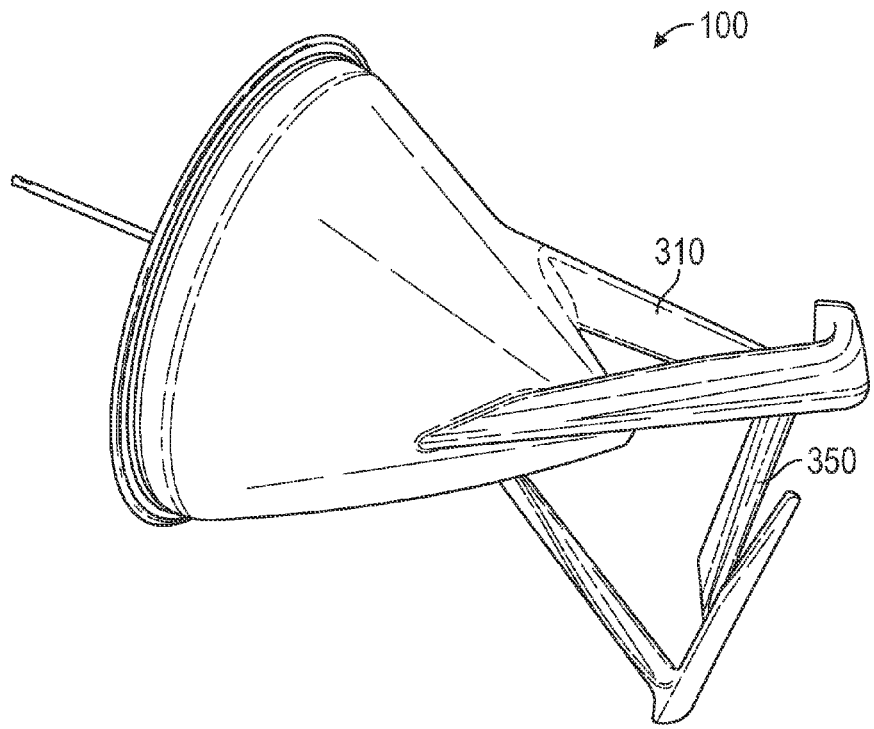
FIG. 12 is a side perspective view of a disclosed embodiment

FIG. 11 and FIG. 12 depict perspective views of disclosed embodiments.

Figure 13:
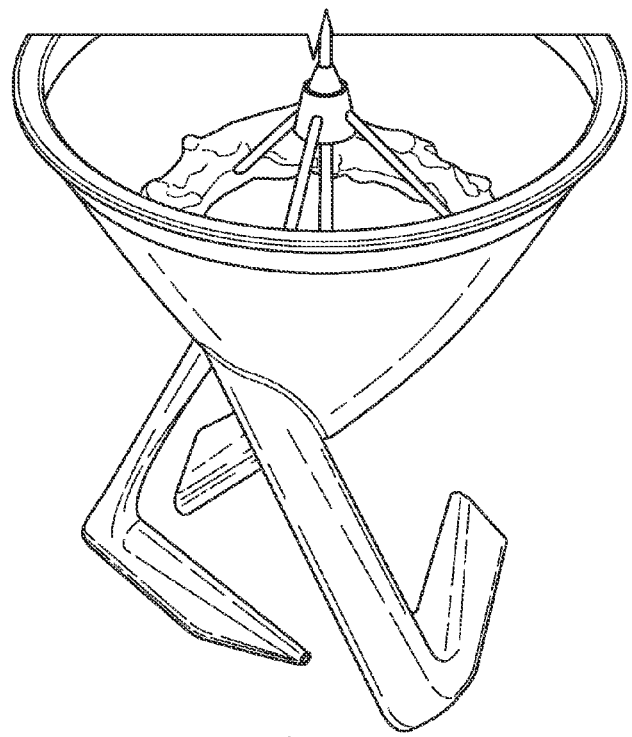
FIG. 13 is a bottom and side perspective view of a disclosed embodiment
Figure 14:
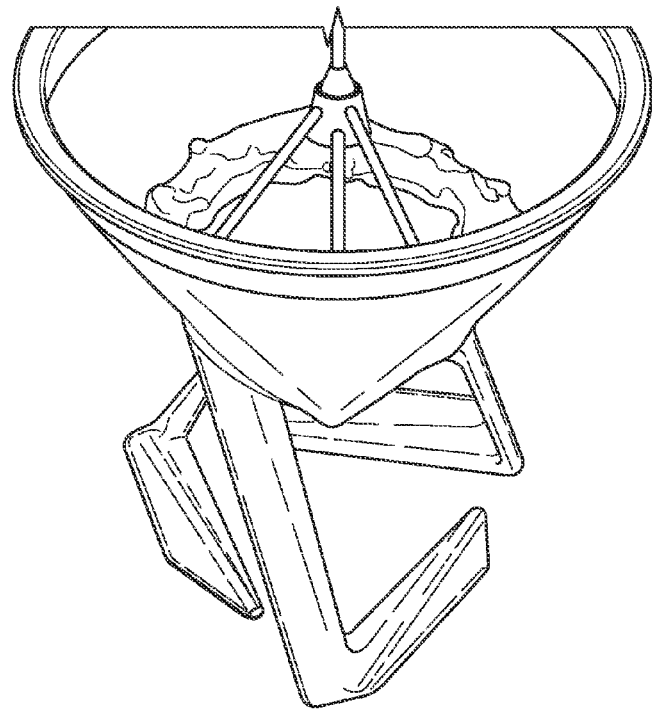
FIG. 14 is a bottom and side perspective view of a disclosed embodiment

FIG. 13 and FIG. 14 depict partial views of disclosed embodiments.

Figure 15:
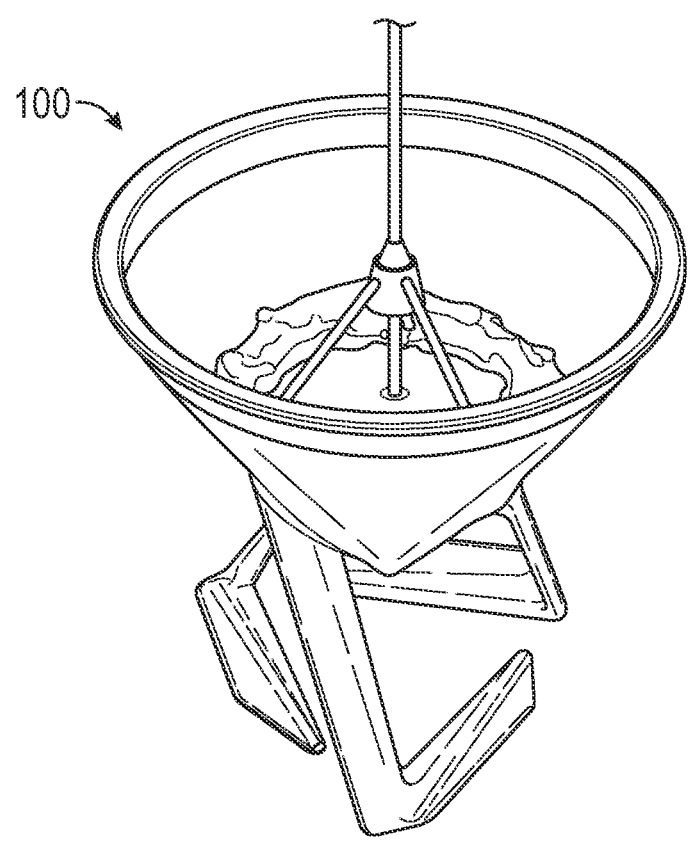
FIG. 15 is a bottom and side perspective view of a disclosed embodiment

FIG. 15 depicts a perspective view of a disclosed embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments include the following items.

1. An air or watercraft propulsion system comprising:
   a) a spinner comprising a spinner tip and a spinner base section;
   b) a front leg, angularly attached to the spinner, the front leg comprising a front leg base section, front leg distal section, front leg leading edge, a front leg trailing edge, a front leg topside and a front leg bottom side; and
   b) a back leg angularly attached to the front leg, the back leg comprising a back leg medial section, a back leg lateral section, back leg leading edge, a back leg trailing edge, a back leg topside and a blackleg bottom side.

2. The system of 1 wherein the front leg is attached to the spinner at an angle of 40 to 80 degrees measured from a longitudinal spinner reference line 400 spanning between the spinner tip and the spinner base section and a longitudinal front leg reference line 430 spanning the front leg distal section and the front leg base section 312.

3. The system of 2 wherein the front leg is attached to the spinner at an angle of 40 to 80 degrees measured from the surface of the spinner and a longitudinal lower surface front leg reference line spanning the lower surface of the front leg.

4. The system of 3 wherein the back leg and front leg are attached an angle of between 40 to 80 degrees measured from the longitudinal front leg reference line and a longitudinal back leg reference line spanning the back leg medial section and the back leg lateral section.

5. The system of 4 wherein the front leg and the back leg are attached at a junction 330 and the junction contains gears to adjust the pitch of the back leg.

6. The system of 4 wherein the front leg and back leg comprise a propeller system.

7. The system of 6 wherein a plurality of propeller systems are attached to the spinner.

The system of 7 wherein each front leg defines a longitudinal void to accommodate mechanical components that reach the junction and reach the gears used to adjust the pitch of a back leg.

What is claimed is:

1. An aircraft propulsion system comprising:
   a) a spinner comprising a spinner tip and a spinner base section;
   b) a front leg, angularly attached to the exterior of the spinner, the front leg comprising a front leg base section, front leg distal section, front leg leading edge, a front leg trailing edge, a front leg topside and a front leg bottom side;
   c) a back leg angularly attached to the front leg, the back leg comprising a back leg medial section, a back leg lateral section, back leg leading edge, a back leg trailing edge, a back leg topside and a blackleg bottom side;
   d) wherein the front leg is attached to the spinner at an angle of 40 to 80 degrees measured from a longitudinal spinner reference line spanning between the spinner tip and the spinner base section and a longitudinal front leg reference line spanning the front leg distal section and the front leg base section; and,
   e) wherein the front leg is attached to the spinner at an angle of 40 to 80 degrees measured from the surface of the spinner and a longitudinal lower surface front leg reference line spanning the lower surface of the front leg.

2. The system of claim 1 wherein the back leg and front leg are attached an angle of between 40 to 80 degrees measured from the longitudinal front leg reference line and a longitudinal back leg reference line spanning the back leg medial section and the back leg lateral section.

* * * * *